Jan. 31, 1967  G. BOSY  3,301,684

TREATMENT OF GRAPE JUICE

Filed May 24, 1960  2 Sheets-Sheet 1

Inventor:
George Bosy
By Soans, Anderson, Luedeka & Fitch Attys.

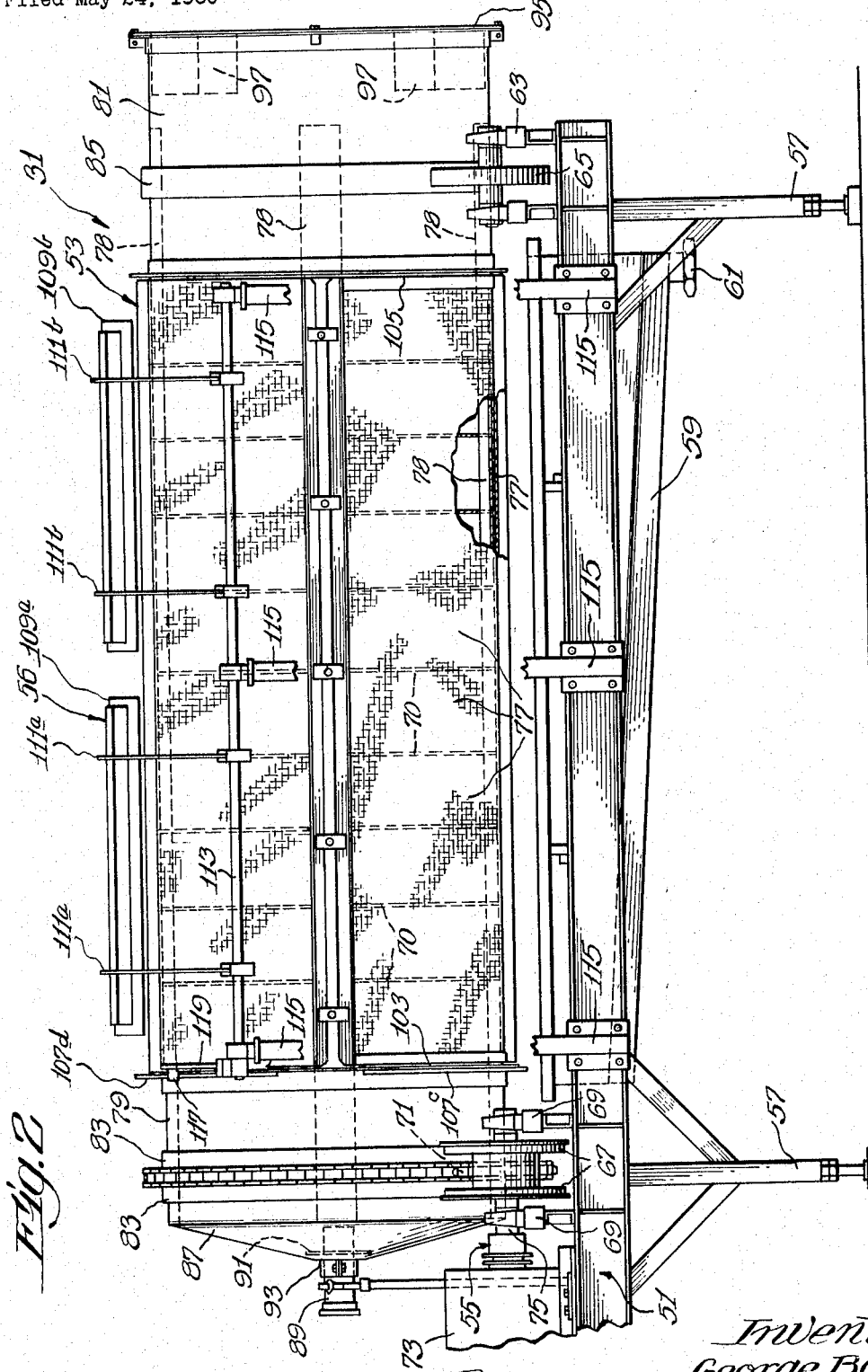

United States Patent Office 3,301,684
Patented Jan. 31, 1967

3,301,684
TREATMENT OF GRAPE JUICE
George Bosy, Chicago, Ill., assignor to National Dairy Products Corporation, New York, N.Y., a corporation of Delaware
Filed May 24, 1960, Ser. No. 31,439
3 Claims. (Cl. 99—105)

The present invention relates generally to the manufacture of grape juice and, more particularly, it relates to methods and apparatus for more efficiently dejuicing grapes.

The recovery of grape juice from grapes is an old and long-established art. However, there have been consistent attempts to improve the processing of grapes for the most efficient and effective recovery of the juice. In this connection, it is, and has been recognized to be, highly desirable to effect the highest yield of grape juice with a low amount of sediment in the juice.

In the manufacture of grape juice, the grapes are usually crushed and stemmed, with the stems being separated from the crushed grapes which comprise juice and pomace, the pomace including the seeds and skins of the grapes. The crushed grapes are introduced into a preheater and it has been known to take the pre-heated juice and add cellulose pulp or paper to it, and then add pectinase to effect improved recovery of juice from the grapes. The mixture is substantially beaten with the pulp in it. In this step of conventional processing, the juice is depectinized and, after such step, the mixture of crushed grapes, which has been depectinized, and paper is introduced into a separation device, such as a rotary screen or presses. However, such devices have provided a juice which, in normal operation, has a high amount of sediment. This high sediment juice is then further treated for use as grape juice or in the manufacture of jelly. The pomace which is separated from the juice may be further treated by introducing it into a press which further separates juice from the pomace.

It is a main object of this invention to provide an improved method and means for recovery of grape juice. It is an additional object of this invention to provide means for more efficiently recovering grape juice. It is another object of this invention to efficiently recover grape juice with a low amount of sediment in the grape juice. Still further objects and advantages of this invention will become apparent by reference to the following description and accompanying drawings, in which:

FIGURE 2 is a side view of a trommel, shown partially broken away, used in the process shown in FIGURE 1.

Figure 1:
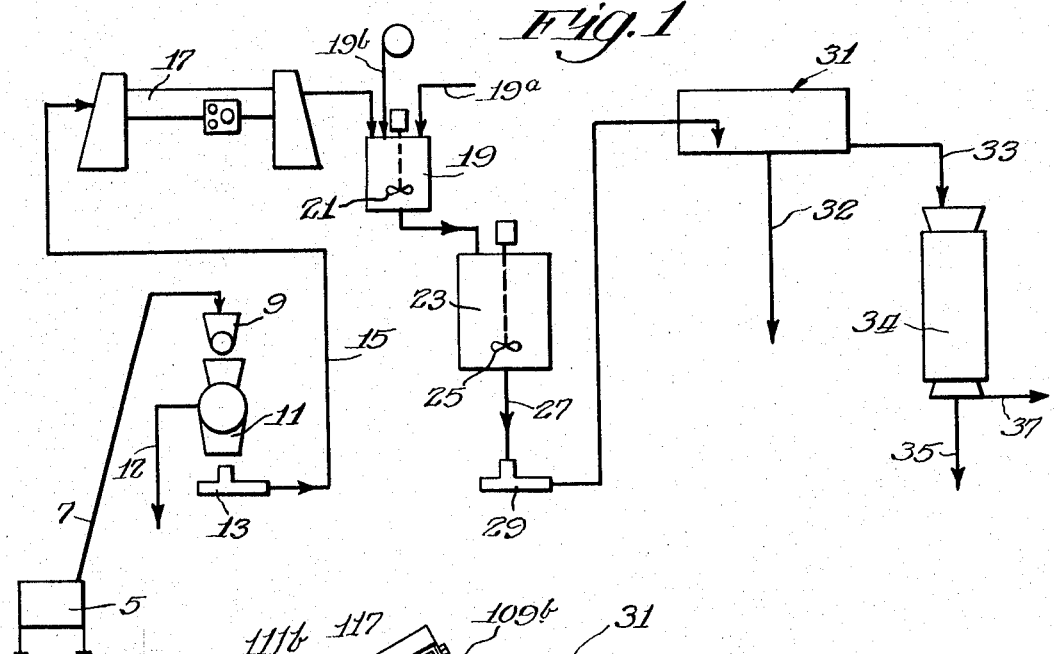
FIGURE 1 is a schematic drawing showing a process, in accordance with this invention, for recovering grape juice from grapes.

The apparatus shown in the drawings is adapted to take grapes, separate the stems and recover a pomace and a grape juice having a low amount of sediment.

Now referring to FIGURE 1 of the drawings, the grapes of commerce are introduced into a wash tank 5 wherein the grapes are cleaned and residual dirt and other matter are washed from the grapes. The grapes leave the wash tank on a conveyor 7, which may be continuously operated, and are introduced into a crusher 9. From the crusher, the grapes drop into a stemmer 11 which operates to separate the stems from grape mash which is a mixture of juice and pomace. The stems are removed through the discharge 12. The wash tank 5, conveyor 7, crusher 9 and stemmer 11 are standard units which have been used heretofore in the manufacture of grape juice.

The grape mash is pumped from the stemmer 11 by means of a pump 13 through a line 15 to a heat exchanger 17. The grape mash enters the heat exchanger 17 at a temperature of about 70° F., though this temperature will fluctuate somewhat, depending upon the seasonal temperature. The temperature at which the mash, including the juice and pomace, enter the heat exchanger 17 is not particularly important as the heat exchanger is adjusted to raise the temperature of the juice and pomace to about 140° F., at which temperature most effective depectinization occurs. The heat exchanger 17 can be any one of several types which has capacity sufficient for the operation of the apparatus shown in FIGURE 1.

The heated grape mash is introduced into a mixing tank 19 in the apparatus shown in the drawings, and, in this tank, the juice and pomace are mixed with paper or cellulose pulp which is conventionally added to the mash in grape juice recovery operations. The line 19a indicates the point of addition of pulp. Pectinase may also be added in this tank to effect the desired depectinization of the grape juice and pomace mixture, the pectinase being added through the line 19b. In the mixing tank there is provided an agitator 21 which is used to disperse the pulp and pectinase throughout the juice and pomace. It is important, as will appear more clearly hereinafter, that over-agitation or beating of the pulp be avoided. Accordingly, the agitator 21 is primarily agitated to the extent necessary to mix the pectinase and disperse the pulp in the grape mash.

From the mixing tank 19 the mixture of pulp, pectinase and grape mash is introduced into a holding tank 23. The mixture is held in this tank for a desired time to effect the desired degree of depectinization for the operation. In this connection, it is conventional to hold the mixture for about one-half hour before subsequent separation of the juice from the other material. It will be understood that the mixing and holding can be accomplished in a single tank.

The hold tank is provided with a mixer 25. This mixer is operated at the end of the holding period to uniformly disperse the paper and pomace throughout the mixture so as to provide a homogeneous mixture, while, at the same time, not providing undue beating of the mixture. This is an important feature of the invention to provide most efficient operation of the process and apparatus of the invention. It has been found that excessive beating of the mixture, including the pulp, results in lower recovery of juice and inefficiency in operation.

In an alternate arrangement, the pectinase may be added to the grape mash prior to the addition of paper material and the depectinization effected prior to such addition. To minimize the beating of the pulp, it may be introduced into a line 27 just prior to introduction into a trommel 31. As previously indicated, this minimizing of beating of the pulp is a desired feature of this invention to provide most satisfactory recovery of grape juice. Substantial beating of the pulp causes hydration of the pulp which results in inefficient operation.

The homogeneous mixture leaves the holding tank 23, in the illustrated embodiment, through line 27 and is pumped by means of pump 29 to a trommel 31 which is of novel construction and design. The trommel, which will be described in greater detail hereinafter, is adapted to provide (a) a moving bed of filtering material and (b) a sufficient head on the bed to cause juice to move through the bed and provide a juice which is slow in sediment. In this connection, the bed should be agitated and a head of at least 5 inches established. The material introduced into the bed should be retained for a time sufficient to permit adequate drainage of the grape juice from the bed.

The juice from the trommel is removed through line 32 and is then treated to remove any fibers which are present, and pasteurized. The juice may then be stored, bottled or made into jelly.

The pomace exists from the trommel 31 through the discharge line 33 and contains absorbed juice which may be pressed out. Accordingly, the pomace is introduced into a press 34 which may be any one of several types of presses which are commercially available. In this connection, such standard presses are hydraulic presses, Zenith presses, Garolla presses, or Willmes presses. The press dicharges a dried pomace material through line 35 and a low sediment juice through line 37. This juice may be pasteurized, stored or bottled, or it may be concentrated for manufacture into jelly.

The pomace which leaves the press through line 35 may be leached to effect further recovery of juice. The pomace may then be treated to recover grape seeds and the skins for further treatment.

The trommel 31, as before indicated, provides an important feature of this invention in providing a moving bed of material through which the grape juice is filtered, the movement of the bed providing the desired efficiency of operation.

Figure 3:
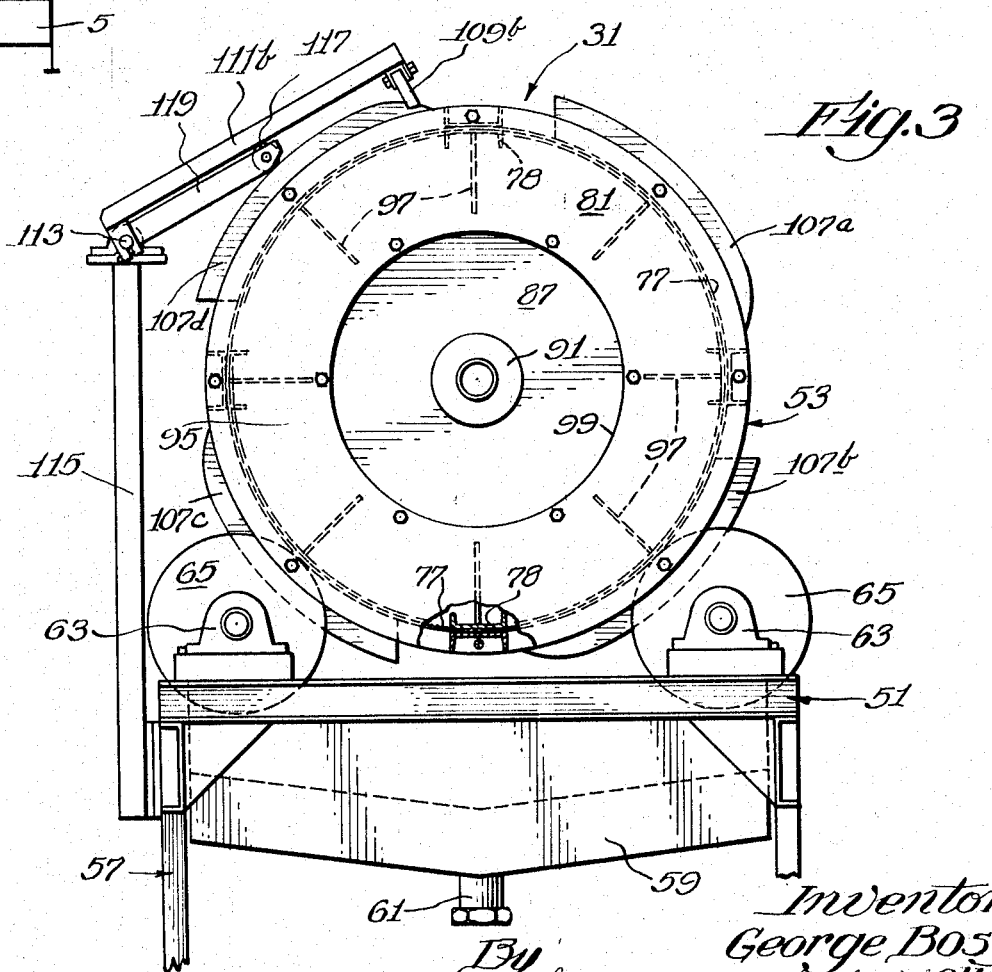
FIGURE 3 is an end view of the trommel shown in FIGURE 2.

The trommel 31 is shown in detail in FIGURES 2 and 3 of the drawings. Referring more particularly to such figures, the trommel 31 comprises a supporting frame 51 on which is carried a rotating screen arrangement 53, the screen being driven by a suitable drive arrangement designated generally with the numeral 55. The trommel further includes screen cleaning means 56, which provides highly efficient operation.

The supporting frame 51 comprises suitable angle and channel sections and is supported by legs 57. The frame carries a juice recovery pan 59 which slopes downwardly and rearwardly to a juice outlet 61 which connects to the line 32 shown in FIGURE 1. Mounted on the frame 51 are suitable journals 63 which carry supporting wheels 65 for the rear end of the rotating screen arrangement 53. The forward end of the rotating screen arrangement 53 is carried on pairs of wheels 67 which are rotatably supported in journals 69 secured to the frame 51. Intermediate the wheels 67 of one pair of wheels 67 is a gear 71 which is driven by a motor 73 through a shaft 75, as shown in FIGURE 2. In the illustrated embodiment, the motor 73 is bolted to the frame 51.

The screen arrangement 53 comprises a generally cylindrical screen section 77 which is built up from the quarter round screen units supported by a series of circumferentially extending rings 70. The screen units of the screen section 77 are secured to longitudinally extending beams 78 which are located circumferentially around the screen section 77, and which are removed about 90 degrees of rotation from each other. The beams 78 are welded or otherwise attached to an inlet section 79 and an outlet section 81. The screen section 77 is made from screen having a mesh of from about 10 mesh to about 30 mesh. The screen preferably has a mesh of about 20. The inlet section 79 and outlet section 81 are provided with rings 83 and 85 which are mounted on the wheels 65 and 67. The inlet section 79 has a circumferentially extending link chain thereon which engages the driven gear 71, thereby causing the screen arrangement 53 to rotate.

The inlet section 79, at its forward end, is closed off with a conical section 87 which has an opening therein for receiving a nozzle 89, this nozzle connecting to the line from the pump 29 to the trommel 31, as shown in FIGURE 1. The nozzle 89 has a splash plate 91, shown in dotted lines in FIGURE 2, which overlies the opening 93 in the conical section 87. The depectinized grape mash is introduced through this nozzle 89 into the trommel 31.

The outlet section 81 is located at the rearward end of the trommel 31 and comprises an imperforate section which is closed off at its rearward end by means of an annular plate 95. Inwardly of the plate 95 are a series of radially extending vanes 97, shown by dotted lines in FIGURES 2 and 3. The vanes 97 extend outwardly from the opening in the plate 95. The dejuiced pomace exits from the trommel 31 through the opening 99 defined by the plate 95.

Mounted at the forward end of the screen section 77 in circumferentially spaced relation are four cams 107a, 107b, 107c and 107d. These cams are associated with the screen cleaning means 56. The screen cleaning means 56 comprises a pair of longitudinally extending knocker bars 109a and 109b which are carried on rocker arms 111a and 111b. These rocker arms are clamped to a shaft 113 journaled in posts 115. The shaft 113 is connected to a cam follower 117 carried on a cam follower arm 119, the cam follower 117 riding on the cams 107a, 107b, 107c and 107d. In the operation of the screen cleaning means 56, the cam follower rides up on the respective cams, when the rotating screen arrangement 53 rotates. When the cam follower 117 drops off the trailing edge of the appropriate cam 107a, 107b, 107c or 107d, the knocker bars 109a and 109b hit the screen, thereby cleaning it. Alternate screen cleaning arrangements may be employed, as for example an air stream, but the cleaning of the screen is necessary to provide efficiency of operation.

The plate 95 at the rearward end of the trommel which defines the opening 99 is proportioned to maintain a head of at least about 5 inches of grape mash in the trommel 31. This partial closing of the end of the trommel to provide the desired head in the trommel is an important feature of this invention. The pomace exits from the opening 99 in the plate 93 and passes through the discharge 33 into the press 34.

In an actual design of the trommel 31, the rotating screen arrangement 53 is about 36 inches in diameter and the screen is of 12 mesh. The screen is rotated at a speed of about 4 r.p.m. Grape mash is introduced into the trommel 31 at the rate of 15 tons per hour and juice is recovered at the rate of 7.5 tons per hour, pomace and unseparated juice being discharged from the trommel at the rate of 7.5 tons per hour. The juice has a sediment of about 3 percent when discharged from the trommel through the line 32. The bed of grape mash in the trommel was 7 inches in depth.

The method and apparatus of this invention provide a rapid means for dejuicing grape mash to provide a juice having a low amount of sediment. A particular feature of the means of the invention is the moving bed of grape mash and fibre which is not hydrated to a high degree. If the fibre is overbeaten, hydration occurs causing the cellulosic pulp or paper to become ineffective in the operation of the moving bed. The repeated cleaning of the rotating screen arrangement is an additional feature of the invention which provides for highly effective operation and assures a proper bottom for the moving bed. It is important to maintain a hydraulic head, in accordance with this invention, upon the bed in order to assure a most effective dejuicing of the grape mash.

The various features of the invention which are believed to be new are set forth in the following claims.

I claim:

1. A method for recovering juice from grape mash, comprising the steps of adding cellulosic pulp to the grape mash, minimizing beating of the pulp, establishing a bed of the mash having a height of at least 5 inches, and substantially continuously agitating said bed of grape mash while recovering juice from the bottom of said bed.

2. A method for recovering juice from grape mash, comprising the steps of adding cellulosic pulp to the grape mash, stirring the pulp into the grape mash without beating of the pulp, establishing a bed of the grape mash having a height of at least 5 inches, and substantially continuously agitating said bed of grape mash while recovering juice from the bottom of said bed.

3. A method for recovering juice from grape mash, comprising the steps of adding cellulosic pulp to the mash, stirring the pulp into the mash without beating of the pulp, establishing a bed of the grape mash having a height of at least 5 inches, supporting said bed, and substantially continuously agitating said bed of grape mash from the bottom of the bed to a position over the bed while recovering juice from the bottom of said bed.

References Cited by the Examiner

UNITED STATES PATENTS

| | | | |
|---|---|---|---|
| 1,258,627 | 3/1918 | Welch | 99—105 |
| 1,767,399 | 6/1930 | Reiling | 99—105 |
| 2,128,432 | 8/1938 | Ramage | 99—105 X |
| 2,340,990 | 2/1944 | Schwartz | 241—79 |
| 2,799,313 | 7/1957 | Schwartz | 241—79 |
| 2,823,126 | 2/1958 | Little | 99—105 |
| 2,837,431 | 6/1958 | Wolcott | 99—106 |

A. LOUIS MONACELL, *Primary Examiner.*

A. H. WINKELSTEIN, *Examiner.*

G. N. MANN, M. W. GREENSTEIN,
*Assistant Examiners.*